United States Patent [19]

Miller

[11] Patent Number: 5,447,735
[45] Date of Patent: Sep. 5, 1995

[54] SWEET CINNAMON OR OTHER FLAVORED, FAT-BASED, ANHYDROUS FLAKES FOR BAKERY PURPOSES

[76] Inventor: Van Miller, R.R. #2, Brisbane, Ontario N0B 1T0, Canada

[21] Appl. No.: 260,222

[22] Filed: Jun. 14, 1994

[51] Int. Cl.⁶ .............................. A23L 1/22
[52] U.S. Cl. .................. 426/285; 426/613; 426/658
[58] Field of Search ............. 426/659, 658, 99, 613, 426/285

[56] References Cited

U.S. PATENT DOCUMENTS

| | | | |
|---|---|---|---|
| 3,582,353 | 6/1971 | Fehr . | |
| 4,384,008 | 5/1983 | Millisor | 426/534 |
| 4,643,907 | 2/1987 | Player . | |
| 4,761,292 | 8/1988 | Augustine | 426/659 |
| 4,925,694 | 5/1990 | Barry | 426/659 |
| 5,073,398 | 12/1991 | Kuss | 426/650 |
| 5,127,953 | 7/1992 | Hamaguchi | 426/610 |
| 5,229,156 | 7/1993 | Yokomizo | 426/533 |
| 5,320,862 | 6/1994 | La Tona | 426/650 |
| 5,354,572 | 10/1994 | Miller | 426/580 |
| 5,356,643 | 10/1994 | Miller | 426/94 |
| 5,370,881 | 12/1994 | Van Miller | 426/658 |
| 5,375,510 | 12/1994 | Miller | 99/470 |

*Primary Examiner*—Carolyn Paden
*Attorney, Agent, or Firm*—Donald E. Hewson

[57] ABSTRACT

An anhydrous fat-based discrete flavoring additive is provided for incorporation into baked goods and flour confections. The discrete flavoring additive product comprises from substantially 0% to 2% by weight of moisture, from about 5% to about 15% by weight of finely ground cinnamon or other flavoring, from about 25% to about 35% by weight of a bakery-compatible oil that is substantially liquid at about 35° C. to about 40° C., with the balance being granulated sugar. The bakery-compatible oil is selected from the group consisting of vegetable oils and liquid butter fats, and mixtures thereof, which exhibit a solid fat index curve characteristic which is substantially that of butter fat. The bakery-compatible oil or fat system has finely ground cinnamon or other flavoring in suspension, is mixed with granulated sugar, and is then solidified at about 6° C. to about 12° C. The product, when solidified, will remain substantially solidified at temperatures below about 35° C., and particularly at room temperature of about 20° C.±. In manufacture, the oil and fat content is mixed together with the finely ground cinnamon or other flavoring, slightly cooled, and then mixed with granulated sugar. It is then cooled at temperatures of from about 6° C. to about 12° C. Other flavors that are compatible with sugar for sweetening, and that may be finely ground for suspension in the fat systems, may include ginger, nutmeg, cloves, allspice, maple sugar, or mixtures thereof.

26 Claims, 2 Drawing Sheets

SWEET CINNAMON OR OTHER FLAVORED, FAT-BASED, ANHYDROUS FLAKES FOR BAKERY PURPOSES

FIELD OF THE INVENTION

This invention relates to anhydrous fat-based flavoring additives intended for incorporation into baked goods and flour confections. Specifically, the present invention is directed to discrete flavoring additive products that may be provided in the form of flakes or chunks, and which are flavored with cinnamon or other flavor and sugar that are carried in a bakery-compatible fat system which is substantially solid at room temperatures. The fat-based flavoring additive of the present invention has a distinctive sweet cinnamon or other flavor, and when consumed has a mouth-sense that provides a sweet crunch or crispness that is imparted to the flavoring by virtue of the granulated sugar component thereof. Other flavorings that are compatible with sugar for sweetening, and which may be incorporated into baked goods and flour confections, are also considered.

Moreover, the present invention provides snack items, specifically a distinctive sweet cinnamon or other flavored layer of the anhydrous fat-based flavoring additive fat system when placed on such as a sweet biscuit. Such snack items may be easily consumed simply be removing an individual snack item from its wrapping or package. The sweet fat-based system has a distinctive sweet cinnamon or other flavor, and as well it provides a sweet crunch or crispness that is imparted to it due to the presence of granulated sugar within the layer that is placed on a sweet biscuit.

BACKGROUND OF THE INVENTION

It has often been attempted throughout the baking industry to provide baked goods and flour confections that may have cinnamon or sweet cinnamon flavoring therein. This is usually achieved simply by the introduction of cinnamon into the flour mixture during its preparation. Occasionally, such as in sweet buns, the cinnamon may be mixed with butter and/or sugar and/or oils, and then swirled into the dough just prior to its being placed in pans or on baking trays for baking.

However, the baking and flour confection industry and the market that it serves are always looking for ways to improve their products, and to introduce new products having specific flavors but differing presentation and/or mouth-sense. One specific requirement that has so far not been met has been the requirement to provide cinnamon flavored additives for incorporation into baked goods and flour confections, where the cinnamon additive has a discrete presence in the baked good or flour confection when it is consumed. Specifically, it has been known for many years to provide such discrete flavoring additives as chocolate chunks, peanut butter chips, butterscotch chips, and the like, for baked goods and flour confections. However, it has not been possible to provide such chips having a good cinnamon flavor release.

Moreover, particularly for incorporation into confection items, it is sometimes desired to have a mouth-sense or crunch such as that which might be found in hard candy—or, more particularly, granulated sugar. Such a criterion is, however, not generally capable of incorporation into baked goods and flour confections. On the other hand, the mere incorporation of granulated sugar does not give a desirable result, because there is no specific carrier in which the granulated sugar may maintain its crystal structure.

Unexpectedly, the present inventor has discovered that by providing a fat-based carrier system that is substantially anhydrous and that comprises a bakery-compatible oil which exhibits substantially the same solid fat index curve characteristics as those of butter fat—so that it is substantially solid at room temperature—then ground cinnamon and granulated sugar may be properly incorporated into the fat system in appropriate proportions and used as flavoring additives in baked goods and flour confections. The resultant product, which may take the form of a flake or chunk, maintains its integrity as a discrete flavoring additive, and when it is consumed it will exhibit the mouth-sense that is required whereby the flake or chunk will be sufficiently granular in nature so as to crunch when it is bitten. As noted hereafter, other finely ground natural flavoring ingredients that are compatible with sugar for sweetening may also be used. Moreover, as discussed hereafter, essentially the same fat system may be incorporated into snack items.

It will be understood, for purposes of this discussion, that use of the word "chunk" implies that the manufactured fat-based discrete flavoring additive product may be in the form of a flake—this is, having a relatively small thickness compared to its length or breadth—or it may take the form of a chunk, which has a relatively large thickness compared to its length and breadth. As noted below, in general neither the flakes or chunks are molded; rather, they are manufactured from a layer of mixed ingredients that are placed on a moving belt and passed through a cooling tunnel, after which they are broken into flakes or chunks.

In order to provide a bakery-compatible oil which may be mixed with liquid butter fats, where the oil and any mixture thereof with butter fat will exhibit a solid fat index curve characteristic which is essentially identical to that of butter fat, there are several criteria which must be satisfied. In particular, the oils that are used in the preparation of fat-based discrete flavoring additives of the present invention must be such that after they are solidified they will not smear when mixed into a bakery mix prior to being baked, and that they should remain substantially solidified and relatively firm during the baking process. Still further, the bakery-compatible oils used in the fat system of the present invention must be such that they will commence to melt in the mouth at approximately 35° C.; and of course, the oils or fats used in the fat system of the present invention must not otherwise conflict with or be intolerable with the intended baked goods or flour confections into which they will be incorporated.

Of course, it is also true that the oils or fats and other ingredients used in preparation of fat-based discrete flavoring additives or snack items of the present invention must be compatible with requirements for controlled ingredient legends and other labelling provisions that are imposed on food products.

One particular goal of the present invention is to provide flavoring additives or snack items whereby cinnamon or other natural flavoring ingredients that are compatible with sugar for sweetening may be carried into a baked product or other flour confection while being suspended in a bakery-compatible fat which has the physical form of a flake or chunk. It has been noted above that the bakery-compatible oil, when liquid, might be mixed with liquid butter fat. In any event, the bakery-compatible oil will exhibit substantially identical solid fat index curve characteristics as those of butter fat. What that means is that the fat ingredients of the present invention will exhibit solid, melting, and liquid characteristics similar to those of butter fat whether or not butter fat is, indeed, included in the homogenous mix of bakery-compatible oils. Therefore, certain dietary and/or religious requirements which preclude the actual use of butter in certain food items which may be consumed at particular times, will be fully satisfied by the sweet fat-based flavoring flakes or chunks of the present invention.

Another aspect of the present invention is to provide snack items having a layer of the basic sweet flavored fat system according to the present invention together with granulated sugar incorporated therein, placed on a sweet biscuit. The sweet biscuit may be such as tea biscuits, arrowroot, bran filled digestive biscuits, graham wafers, and the like. The purpose is to provide a snack—a small portion of food that is usually tasty and which may or may not be consumed at the table—or even a light desert-like serving of sweet, easily consumed and easily digested food. In any event, the snack system provided by the present invention employs essentially the same fat system which is flavored with cinnamon or other flavorings compatible with sugar, as discussed below, which may be easily manufactured essentially be molding a layer of the sweet fat-based system and placing a sweet biscuit onto or slightly into the surface of that layer before it has fully cooled. When cooled, the snack item with have exceptional shelf-life, and it will be substantially anhydrous and firm, and thus without a fatty or greasy touch when held in the fingers for the purposes of consuming the same.

One prior flavoring additive is that taught in FEHR et al U.S. Pat. No. 3,582,353 issued Jun. 1, 1971. There, a flavored and/or colored shortening material of hard fat having a sharp melting point is used, and distributed into the bakery mix. What results is distributed localized areas throughout the baked product, when it has been baked, that have a particular mouth sensation similar to that of butter. The flavoring materials may include spices, simulated meat, fruit, fowl, or vegetable flavors, or other dairy flavors, as well as organic acids to provide sour flavors and the like. The resulting baked product is reported to have identifiable localized areas of the colored and/or flavored flakes in spots throughout the baked product, that have a discernable taste. It must be noted, however, that the FEHR et al patent describes only localized areas of concentrated flavor where the flavor is not necessarily a true or real flavor, and particularly which might be specifically of a gummy texture and/or caramelized flavor. Moreover, the FEHR et al product is essentially fat, having very little solid constituent present, and not being capable of providing a mouth-sense which includes a crunch due to the presence of granulated sugar, as in the case of the present invention.

Because of the fat system incorporated into fat-based discrete flavoring additives of the present invention, the dry cinnamon or other sweet flavored flakes or chunks provided by this invention may be incorporated into baked products or other flour confections in such a manner that varying products as tea biscuits or muffins which may have a relatively fast baking time—for example, ten or fifteen minutes—at baking temperatures of about 177° C. (350° F.) may be made; while other discrete flakes or chunks according to the present invention may be baked into breads or other confections that might have baking times of thirty to forty minutes at temperatures above 177° C.

Moreover, the present invention also contemplates the provision of other flavoring additives that have the same general characteristics and criteria as discussed above, but in which the flavoring ingredient is other than cinnamon. Specifically, the present invention contemplates other natural flavoring agents that are compatible with sugar for sweetening, and that may be finely ground so as to be suspended in the fat system which forms the basis of the dry fat-based flake or chunk, or snack item, together with granulated sugar. Such other natural flavoring ingredients may be, for example, ginger, nutmeg, cloves, allspice, maple sugar (or dehydrated maple syrup), or mixtures thereof.

BRIEF DESCRIPTION OF THE DRAWING

For purposes of the present discussion, the manufacture of the discrete fat-based flavoring additives or snack items in keeping with the present invention, will be described in association with the accompanying drawings, in which.

DETAILED DESCRIPTION OF THE PREFERRED EMBODIMENTS

Figure 1:
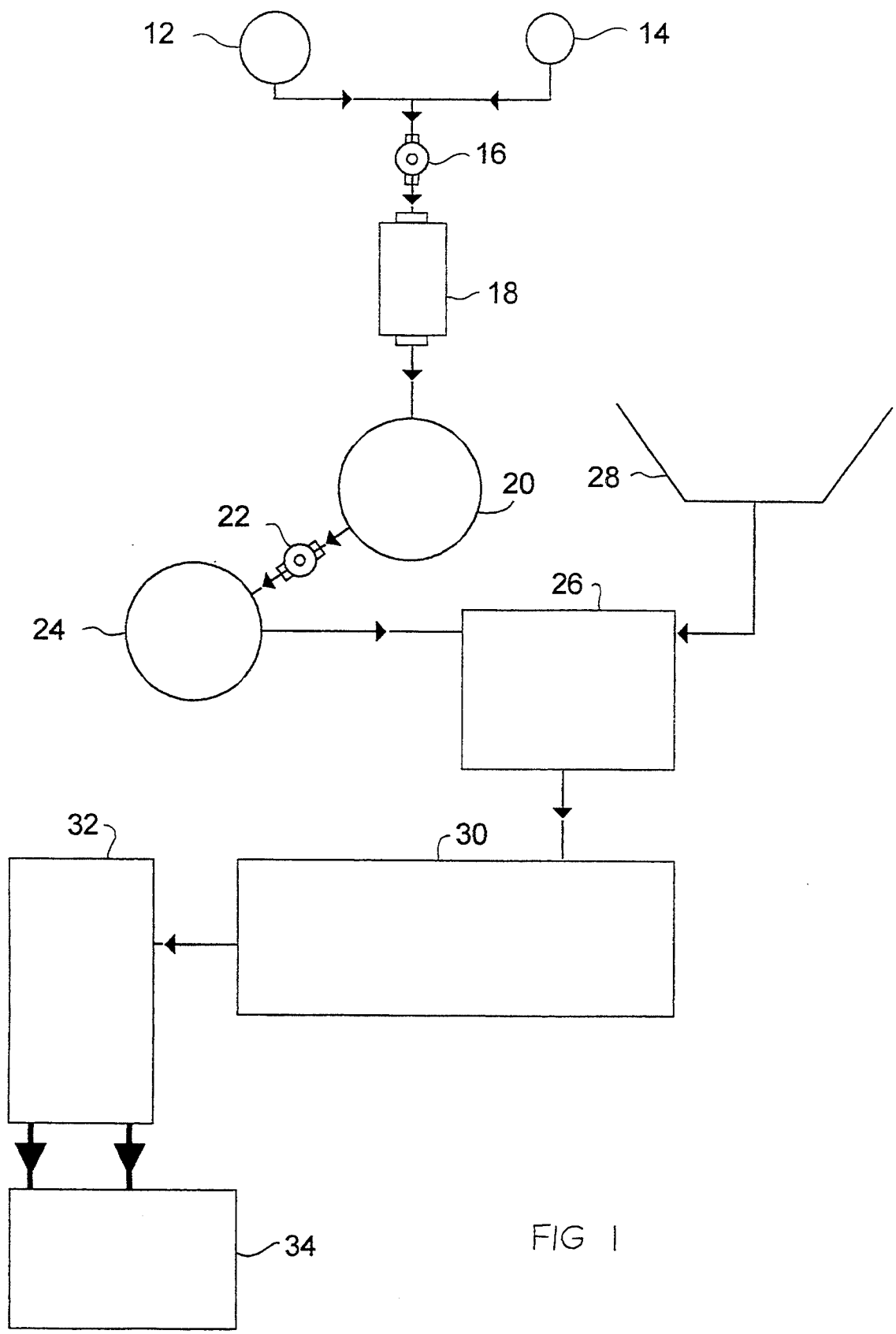
FIG. 1 is a schematic floor plan of a manufacturing facility in which the cinnamon (or other) flavored discrete flavoring additives may be made.

In keeping with the present invention, the fat-based discrete flavoring additive or the fat system of the snack item is substantially anhydrous, in that it is has from substantially 0% to about 2% by weight of moisture therein. The discrete flavoring flake or chunk that is made in keeping with the present invention will have from about 5% to about 15% by weight of finely ground cinnamon or other natural flavoring agent, together with from about 25% to about 35% by weight of a bakery-compatible oil, with the balance being granulated sugar. The bakery-compatible oil is such that it is substantially liquid at elevated temperatures of about 35° C. to about 40° C. For purposes of this discussion, cinnamon shall be considered as the flavoring agent being used. Also, the usual embodiment of the discrete flavoring additives of the present invention, when incorporated into baked goods or flour confections, is as flakes. However, there may be occasions—such as the manufacture of novelty cookies or muffins—where larger or thicker discrete flavoring additives in the form of chunks, are required. There may also be the snack items, discussed below.

The bakery-compatible oil may be a suitable vegetable oil, liquid butter fat, or other liquid dairy fat, and mixtures thereof when liquid during the manufacturing stage. In any event, the bakery-compatible oil will exhibit generally similar solid fat index and melting points as those of butter fat, as described in greater detail hereafter. Moreover, the bakery-compatible oil must be such that it may be miscible with liquid butter fat at temperatures of about 35° C. to about 50° C., so that if they are mixed they will make a substantially homogenous mixture. Moreover, any bakery-compatible oil or mixtures thereof with liquid dairy fat will be such that it will crystallize in much the same manner as chocolate when found in chocolate-compatible fats, so that when solid the product will offer a snap in much the same way that chocolate will snap if it is broken.

Moreover, as noted above, the characteristic curves which describe the solid fat index and melting points of the bakery-compatible oils, and butter fat, should be substantially similar to each other, and thus they will exhibit the characteristic that they are sufficiently stable at about room temperature of 20° C.± so that the oils will not smear during mixing with other prescribed ingredients of the baked goods and flour confections being made, prior to those baked goods and flour confections being baked.

When bakery products such as breads are being manufactured, the dough from which the bread is baked is usually proofed prior to baking. Thus, the anhydrous fat-based discrete flavoring additives of the present invention must be such that they have sufficiently slow flow rates that they will stay relatively firm in the form of flakes or chunks as they are provided, during the bakery proofing process which may take place at temperatures of from about 40° C. up to about 60° C., and for periods ranging from a few minutes up to about a few hours. On the other hand, the anhydrous fat-based discrete flavoring additives or the fat system of the snack items of the present invention must also generally have a melting point of about 35° C. to about 40° C., so that they will melt in the mouth when the baked goods, flour confections, or snack items, are eaten. Still further, the discrete flavoring additives in the form of flakes or chunks, or in the discrete sweet fat system layer of the snack items, must present the crunch that is imparted to them by the granular sugar still being contained and held in the flakes, chunks, or fat system of the snack items, even as they are being consumed.

As noted, bakery-compatible oils used in the present invention must be miscible with liquid butter fat in any proportion, at temperatures of about 35° C. to about 50° C. Thus, if they are mixed together, they will make a substantially homogenous mixture. If so, then they will solidify or crystallize at lower temperatures as an homogenous mixture. The following table addresses the solid fat index curve ranges for vegetable oils, liquid butter fats, and mixtures thereof, which characteristics are essentially those of butter fat, and which in any event are as follows:

SOLID FAT INDEX CURVE CHARACTERISTICS FOR VEGETABLE OILS, BUTTER FATS, AND MIXTURES THEREOF 10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;

It may be that, in order to achieve the solid fat index curve characteristics set forth in the table, above, it will be necessary to process the solid fats of the vegetable oils being used by blending them, or fractionating, or hydrogenating, but only to the extent necessary so as to obtain the solid fat index curve having the defined ranges of solid and liquid components at the defined temperatures. Moreover, so as to generally exhibit a snap when broken, the solidified fats will usually be more to the solid limits within the above table. Thus, so-called "hard butter+—vegetable oils and mixtures thereof showing butter fat solid fat index curve characteristics at the more solid end of the ranges of the above table—is particularly useful for purposes of the present invention.

Some further discussion of the discrete flavoring additives or the fat system of snack items, having finely ground cinnamon or other flavors and granulated sugar incorporated thereinto, now follows:

First, by providing the fat system of the present invention, and following the manufacturing steps that are discussed hereafter, an homogenous mixture of oils in any desired proportion of vegetable oils and liquid butter fats ranging from substantially 0% to substantially 100% of either, and mixtures thereof, will have finely ground cinnamon or other natural flavoring ingredient suspended therein. When the fat component is liquid, then the cinnamon is held in suspension; and when the fat system solidifies, the cinnamon is still held in suspension but in much more immobile fashion since at lower temperatures there is substantially little liquid fat component. The cinnamon is naturally occurring cinnamon that has been finely ground, in keeping with well known procedures therefor. Likewise, other natural flavoring ingredients that are compatible with sugar for sweetening, such as ginger, nutmeg, cloves, allspice, maple sugar (or dehydrated maple syrup), or mixtures thereof, will be finely ground so as to be carried into suspension in the fat system.

As to the sugar component, it is a granulated sugar and is generally fine granulated sugar, or it may be a mixture of coarse and fine granulated sugar. This is necessary to provide the sugar crunch. Thus, confectioners' sugar or powdered sugar is not utilized. The sugar component, when it is a mixture of coarse and fine granulated sugars, may comprise from at least 10% up to 90% of coarse granulated sugar with the balance of the sugar component being fine granulated sugar.

It should also be noted that the present invention differs very considerably from the well known techniques that surround the production of chocolate, such as chocolate chips. There, one of the criteria for a successful product is that the sugar that is mixed with the fat system being used must be very fine. Thus, powdered sugar or confectioners' sugar are employed. In contradistinction thereto, the present invention requires the use of granulated sugar which offers a crunch when it is bitten into. Moreover, the suspension of the sugar, together with the flavoring, in the fat system, is contrary to chocolate chip manufacture, which requires fineness and non-granularity of the fat system and flavoring.

Essentially, as noted above, the finely ground cinnamon or other flavoring ingredient is held in suspension in the fat system, and the sugar granules are enrobed by the fat. Thus, when they are manufactured into flakes, or chunks, as described below, the sugar granules remain in place.

Turning now to the process by which the anhydrous fat-based discrete flavoring additives of the present invention are manufactured, in its broadest sense, the process comprises the following steps:

(a) mixing the bakery-compatible oil—which may be vegetable oils, liquid butter fat, and mixtures thereof—with finely ground cinnamon in a mixer at a temperature of about 35° C. to about 50° C., so as to obtain an homogenous mixture having the cinnamon suspended therein;

(b) transferring the homogenous mixture to a holding tank, and maintaining the temperature of the homogenous mixture at about 39° C. to about 45° C.;

(c) continuously agitating the homogenous mixture while it is in the holding tank;

(d) pumping the homogenous mixture to a tempering unit, continuously agitating the homogenous mixture while in the tempering unit, and slightly cooling the homogenous mixture to about 29° C. to about 34° C.;

(e) transferring the slightly cooled homogenous mixture to a further mixing tank, and mixing granulated sugar therewith;

(f) transferring the resultant sugar, cinnamon, and oil mixture to a further discrete particle manufacturing means so as to produce discrete flakes or chunks from that resultant sugar, cinnamon, and oil mixture;

(g) cooling the discrete flakes or chunks to a temperature of from about 6° C. to about 12° C.; and (h) finally, removing the cooled discrete flakes or chunks for further handling and/or storage and/or shipping.

From the above, it is clear that the oils and/or liquid fats being used are substantially in a liquid phase above about 35° C. to about 40° C., and are miscible as liquids, and that they are substantially solidified at least at about 6° C. to about 12° C. Moreover, once solidified, they will remain firm and will show no tendency to smear at about room temperature of 20° +.

Steps (c) and (d) could be carried out in the same tank, but it is more usual to use a holding tank and then a tempering unit because the mixture in the tempering unit is at a slightly lower temperature, and thus by using both a holding tank and a tempering trait the manufacturing process can be substantially continuous rather than by batch.

Referring to FIG. 1, the apparatus on which anhydrous fat-based discrete flavoring additives in keeping with the present invention will now be described.

Essentially, the apparatus 10 begins with a pair of storage tanks—which may, of course, be a series of tanks—12 and 14 in which vegetable oils and liquid butter fats, and mixtures thereof, may be maintained, as well as finely ground cinnamon or other finely ground natural flavoring agents. Those components may be pumped by pump 16 to a mixer 18, where the bakery-compatible oil and the finely ground cinnamon are mixed at a temperature of about 35° C. to about 50° C. There is thus obtained an homogenous mixture having the finely ground cinnamon suspended in the oil. The homogenous mixture is then transferred to a holding tank 20, where it is maintained at a temperature of about 39° C. to about 45° C., and continuously agitated while it is in the holding tank.

Then, using pump 22, the homogenous mixture may be pumped from the holding tank 20 to a tempering unit 24. While in the tempering unit 24, the homogenous mixture is continuously agitated and it is slightly cooled to a temperature of about 29° C. to 34° C. Thereafter, the slightly cooled homogenous mixture is transferred to a further mixing tank 26.

A storage bin or tank 28 is provided in which granulated sugar—which may be finely granulated or mixtures of finely granulated sugar and coarse granulated sugar—is stored. Granulated sugar is also transferred to the mixing tank 26 for mixing with the slightly cooled homogenous mixture that has been delivered to it from the tempering unit 24.

Then, the resultant sugar, cinnamon, and oil mixture is transferred to a manufacturing means identified generally at 30 so as to produce discrete flakes or chunks from the mix. That manufacturing means 30 usually comprises machinery having a continuous belt and a cooling tunnel. There, the mixture of sugar, cinnamon, and oil, may be placed onto a moving belt and moved through a cooling tunnel so as to be cooled and thereby to solidify the product. If the mixture has been spread thinly onto the moving belt, it may then be broken up into flakes. However, if the mixture is spread more thickly onto the moving belt, then when it has been cooled it may be broken into discrete chunks. In general, the dwell time of the layer of the mixture on the moving belt has to be adjusted, depending on the thickness of the layer.

In any event, the apparatus of the present invention is shown to comprise a cooling means 32 in which the mixture which will be broken into discrete flakes or chunks being manufactured are cooled to a temperature of from about 6° C. to about 12° C. Thereafter, they are removed or delivered to a handling or packaging station identified at 34, for further handling and/or storage and/or shipping.

The basic steps in the process for preparation of an edible anhydrous fat-based manufacture into flake or chunk products; wherein said edible anhydrous fat-based sweetened flavored fat system is intended for incorporation into baked goods and flour confections or for use in snack items, comprises the steps of:

(a) as before, mixing the bakery-compatible oil and the finely ground natural flavoring agent in a mixer at a temperature of about 35° C. to about 50° C. so as to obtain an homogenous mixture having the finely ground natural flavoring agent suspended therein;

(i) pumping the homogenous mixture to a tempering unit, continually agitating the homogenous mixture while in the tempering unit, and slightly cooling the homogenous mixture to about 29° C. to about 34° C.;

(j) transferring the slightly cooled homogenous mixture to a further mixing tank and mixing the granulated sugar therewith;

(k) transferring a predetermined portion of the resultant sugar, finely ground natural flavoring agent, and oil mixture to a cooling means;

(l) continuing to cool the predetermined portion of the homogenous mixture;

(o) finally, removing the cooled predetermined portion of the sweetened flavored fat system for further handling and/or storage and/or shipping.

Figure 2:
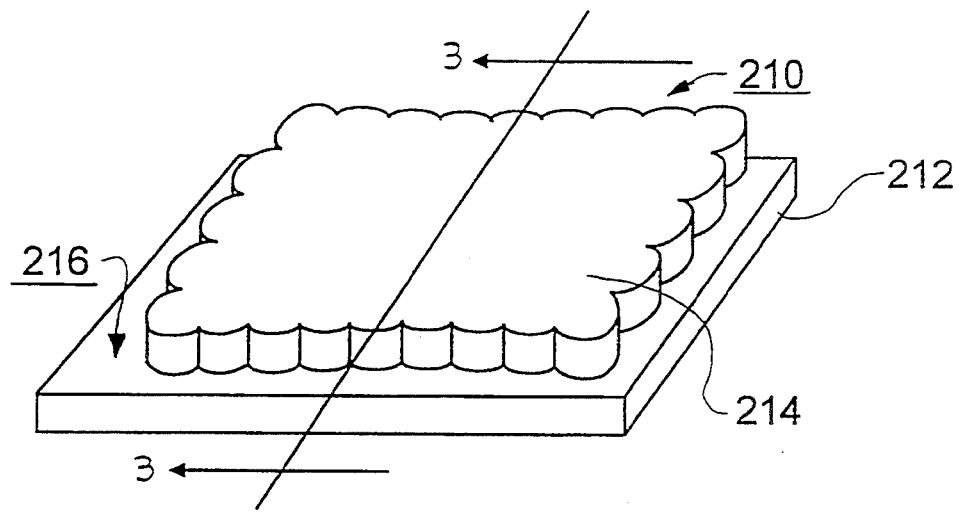
FIG. 2 is an idealized perspective view of a typical molded snack item having the sweet flavored fat system of the present invention together with a sweet biscuit.
Figure 3:
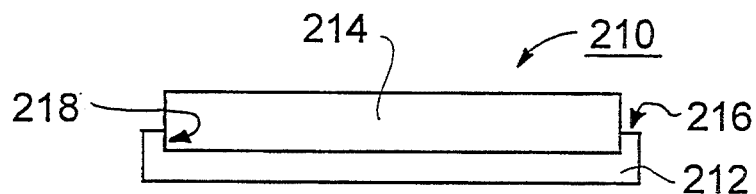
FIG. 3 is view taken along lines 3—3 of FIG. 2.
Figure 4:
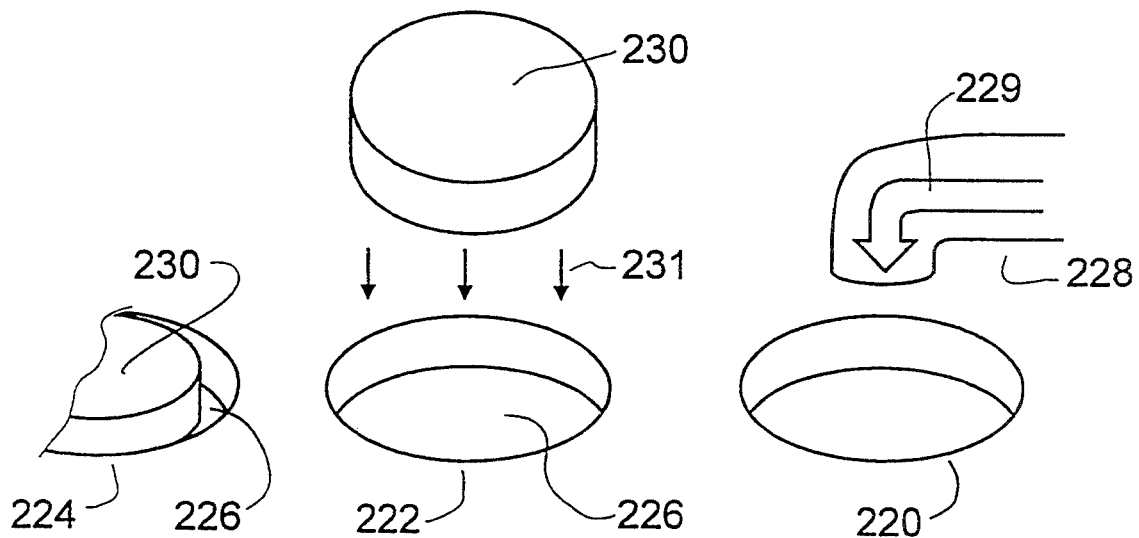
FIG. 4 is an idealized representation of the progress steps followed during the manufacture of a molded sweet flavored fat system layer and biscuit snack item of the present invention.

Turning now to FIGS. 2 through 4, a typical snack item 210 is shown, having a first discrete layer 212 and a second discrete layer 214. The first discrete layer 212 is an anhydrous molded sweet flavored fat-based disk or medallion, whose constituents are in keeping with the invention as described above; the second layer 214 is a pre-baked sweet biscuit.

The preparation of the anhydrous sweet flavored layer of the snack item, and its characteristics, are as discussed above. Thus, as noted, the sweet flavored fat system component 212 of the snack item comprises from substantially 0% to 2% by weight of moisture, from about 5% to about 15% by weight of a finely ground natural flavoring agent, from about 25% to about 35% by weight of a bakery-compatible oil that is substantially liquid at about 35° C. to about 40° C., with the balance being granulated sugar.

In its broadest sense, the preparation of the anhydrous fat-based sweetened flavor discrete layer of the snack item 210, comprises the following steps:

(a) as before, mixing the bakery-compatible oil and the finely ground natural flavoring agent in a mixer at a temperature of about 35° C. to about 50° C. so as to obtain an homogenous mixture having the finely ground natural flavoring agent suspended therein;

(i) pumping the homogenous mixture to a tempering unit, continually agitating the homogenous mixture while in the tempering unit, and slightly cooling the homogenous mixture to about 29° C. to about 34° C.;

(j) transferring the slightly cooled homogenous mixture to a further mixing tank and mixing the granulated sugar therewith;

(k) transferring a predetermined portion of the resultant sugar, finely ground natural flavoring agent, and oil mixture to a mold, in which the molded first discrete layer will be prepared;

(l) continuing to cool the predetermined portion of the homogenous mixture that has been placed in the mold, while it is still in the mold;

(m) before the homogenous mixture has cooled to the extent that the bakery-compatible oil is still at least slightly liquid, a pre-baked sweet biscuit is placed into the mold and onto the surface of the cooled homogenous mixture;

(n) continuing to cool the homogenous mixture and the sweet biscuit until the bakery-compatible oil constituent has solidified;

(o) finally, unmolding the cooled combination of the sweetened flavored fat system and sweet biscuit, for further handling and/or storage and/or shipping.

Having regard to FIGS. 3 and 4, it will be noted that the sweet biscuit 214 has a smaller projected area than that of the layer of the sweetened flavored fat-based disk or medallion 212. Therefore, a border area designated generally at 216 surrounds the periphery of the sweet biscuit 214.

Also, as seen in FIG. 4, the dry molded sweetened flavored fat system disks or medallions 212 overlie at least a portion of the sweet biscuit 214 which extends below the surface 216. Thus, the sweet biscuit 214 will extend into the molded and sweetened flavored fat system medallion 212, at least to some extent.

So as to effectively secure bonding of the sweet biscuit 214 to the layer 212, a light pressure against the sweet biscuit 214 may be applied so as to slightly embed it into the layer 212, before that layer is fully solidified or set.

Now, turning to FIG. 4, several steps in the process of manufacture of snack items 210 according to the present invention are shown. In this case, it is contemplated that the snack item will generally have a round configuration when viewed from above.

Three consecutive mold cavities 220, 222, and 224 are shown. Mold cavity 220 is, as yet, unfilled; whereas mold cavity 222 already has placed in it a predetermined portion or charge 226 of the homogenous mixture, which will cool to form the discrete disk or layer 212 of the respective snack item. That predetermined portion or charge 226 is placed into the mold cavity such as by being dispensed from a dispensing nozzle 228, as shown at arrow 229.

A sweet biscuit 230 is to be placed onto or slightly into the surface of the charge 226 in mold 222, by being placed downwardly thereinto as shown at arrow 23 1. Then, as shown with respect to the mold cavity 224, the charge of the sweetened flavored homogenous mixture 226 and the sweet biscuit 230 are then subjected to further handling.

That further handling will, at this stage, comprise cooling the combination of the layer 212 and the biscuit 214 so as to substantially fully solidify the bakery-compatible oil having the finely ground flavoring therein, and to encapsulate and maintain the granulated sugar in its crunchy status. This comprises carrying out step (n), by cooling the then-formed snack item to a temperature of from about 6° C. to about 12° C. The latter step is expeditiously achieved by passing the molds through a cooling tunnel or, in any event, into a cooling means 32.

Thus, the manufactured snack item has become a dry molded product. The manufacturer's name may be conveniently be molded into the layer 212. As noted above, because of the manufacturing processes described herein, the snack item has a sweetened flavored fat system layer which is easy to handle and which does not have a fatty or greasy texture or feel. The unmolded snack items which are thereby processed may be conveniently wrapped or packaged, and will exhibit exceptional or extended shelf-life without the necessity for special storage, except to maintain them in a dry environment—generally, at normal room temperatures of about 16° C. to about 22° C.

Generally, when the molded snack item is demolded or removed from the mold cavity, it may be individually wrapped and then packaged together with other similar items in a package. Individual molded and wrapped snack items according to the present invention may be conveniently sold from point-of-purchase counter displays.

There has been described an anhydrous fat-based discrete flavoring additive in which cinnamon and sugar are provided as discrete flakes or chunks for incorporation into baked goods or flour confections. The flavoring additive is such that it will retain its integrity as a flake or chunk even when it is incorporated into baked goods or flour confections, and will provide a mouth-sense that has a crunch due to the presence of granulated sugar, together with a distinct cinnamon flavor. As noted, other flavors that are compatible with sugar may also be used.

There has also been provided a snack item which may be conveniently carried in a pocket, lunch box, briefcase, etc., which may be readily unwrapped and consumed without creating any mess, and which gives a pleasant mouth sensation including the sweet flavor and crunch imparted to it by the granulated sugar. This snack item is healthy and convenient, and will not readily degrade so as to result in a health or allergy hazard. Thus, there has been described a convenient snack item, and a process for its manufacture.

Other modifications and alterations may be used in the design and manufacture of the mechanical security apparatus of the present invention without departing from the spirit and scope of the accompanying claims. For instance, with appropriate modification to chip manufacturing equipment, especially so as to accommodate the incorporation of granulated sugar in the mixture, the flake or chunk product of the present invention might be manufactured in the form of chips or molded chunks.

The scope of the invention is defined by the accompanying claims.

What is claimed is:

1. An edible anhydrous fat-based sweetened flavored fat system which may be molded in a mold or spread onto a belt for manufacture into flake or chunk products; wherein said edible anhydrous fat-based sweetened. flavored fat system is intended for incorporation into baked goods and flour confections or for use in snack items, and comprises from substantially 0% to 2% by weight of moisture, from about 5% to about 15% by weight of a finely ground natural flavoring agent, from about 25% to about 35% by weight of a bakery-compatible oil that is substantially liquid at about 35° C. to about 40° C., with the balance being granulated sugar;

wherein said bakery-compatible oil exhibits a solid fat index curve characteristic having defined ranges of solid fat and liquid fat components at defined temperatures, as follows:

10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;

wherein said bakery-compatible oil is selected from the group consisting of vegetable oils and liquid butter fats, and mixtures thereof, which exhibit the said solid fat index curve characteristic; and wherein said bakery-compatible oil solidifies at about 6° C. to about 12° C. and remains substantially solidified at temperatures below about 35° C.

2. An anhydrous fat-based discrete flavoring additive for incorporation into baked goods and flour confections, wherein said discrete flavoring additive comprises from substantially 0% to 2% by weight of moisture, from about 5% to about 15% by weight of a finely ground natural flavoring agent, from about 25% to about 35% by weight of a bakery-compatible oil that is substantially liquid at about 35° C. to about 40° C., with the balance being granulated sugar;

wherein said bakery-compatible oil exhibits a solid fat index curve characteristic having defined ranges of solid fat and liquid fat components at defined temperatures, as follows:

10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;

wherein said bakery-compatible oil is selected from the group consisting of vegetable oils and liquid butter fats, and mixtures thereof, which exhibit the said solid fat index curve characteristic; and wherein said bakery-compatible oil solidifies at about 6° C. to about 12° C. and remains substantially solidified at temperatures below about 35° C.

3. The flavoring additive of claim 2, wherein said finely ground natural flavoring agent is selected from the group consisting of cinnamon, ginger, nutmeg, cloves, allspice, maple sugar, dehydrated maple syrup, and mixtures thereof.

4. The flavoring additive of claim 3, wherein said finely ground natural flavoring agent is cinnamon.

5. The flavoring additive of claim 4, wherein said granulated sugar is fine granulated sugar.

6. The flavoring additive of claim 4, wherein said granulated sugar component comprises a mixture of coarse and fine granulated sugar.

7. The flavoring additive of claim 6, wherein said mixture of coarse and fine granulated sugar comprises from at least 10% up to 90% of coarse granulated sugar with the balance of said mixture being fine granulated sugar.

8. The flavoring additive of claim 4, wherein said bakery-compatible oil exhibits the characteristic that it is stable at about room temperature so as not to smear during mixing with the other prescribed ingredients of said baked goods and flour confections into which said discrete flavoring additive is being incorporated, prior to said baked goods and flour confections being baked.

9. The flavoring additive of claim 4, wherein said bakery-compatible oil exhibits the characteristic that it has slow flow rates so as to stay substantially firm during a baking process at temperatures of from about 170° C. up to about 200° C., for periods of from about 5 minutes up to about 45 minutes.

10. The flavoring additive of claim 4, wherein said bakery-compatible oil exhibits the characteristic that it has slow flow rates so as to stay substantially firm during a bakery proofing process at temperatures of from about 40° C. up to about 60° C., for periods of from a few minutes up to about a few hours.

11. The flavoring additive of claim 4, wherein, when necessary, said solid fat constituents of said vegetable oils are processed by being blended or fractionated or hydrogenated only to the extent necessary so as to obtain the said solid fat index curve characteristic having said defined ranges of solid fat and liquid fat components at said defined temperatures.

12. The flavoring additive of claim 4, wherein said discrete flavoring additive is in the form of flakes or chunks thereof.

13. A snack item comprising a first discrete and a second discrete layer, wherein said first discrete layer is anhydrous sweetened flavored molded fat system disk, and said second layer is a baked flour-based sweet biscuit;

wherein said first discrete layer comprises from substantially 0% to 2% by weight of moisture, from about 5% to about 15% by weight of a finely ground natural flavoring agent, from about 25% to about 35% by weight of a bakery-compatible oil that is substantially liquid at about 35° C. to about 40° C., with the balance being granulated sugar;

wherein said bakery-compatible oil exhibits a solid fat index curve characteristic having defined ranges of solid fat and liquid fat components at defined temperatures, as follows:

10.0° C.—43–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;

wherein said bakery-compatible oil is selected from the group consisting of vegetable oils and liquid butter fats, and mixtures thereof, which exhibit the said solid fat index curve characteristic; and wherein said bakery-compatible oil solidifies at about 6° C. to about 12° C. and remains substantially solidified at temperatures below about 35° C.

14. The snack item of claim 13, wherein said finely ground natural flavoring agent is selected from the group consisting of cinnamon, ginger, nutmeg, cloves, allspice, maple sugar, dehydrated maple syrup, and mixtures thereof.

15. The snack item of claim 13, wherein said finely ground natural flavoring agent is cinnamon, and said granulated sugar comprises a mixture of coarse and fine granulated sugar.

16. A process for the preparation of an edible anhydrous fat-based sweetened flavored fat system which may be molded in a mold or spread onto a belt for manufacture into flake or chunk products; wherein said edible anhydrous fat-based sweetened flavored fat system is intended for incorporation into baked goods and flour confections or for use in snack items, and comprises from substantially 0% to 2% by weight of moisture, from about 5% to about by weight of a finely ground natural flavoring agent, from about 25% to about 35% by weight of a bakery-compatible oil that is substantially liquid at about 35° C. to about 40° C., with the balance being granulated sugar;

wherein said bakery-compatible oil exhibits a solid fat index curve characteristic having defined ranges of solid fat and liquid fat components at defined temperatures, as follows:
   10.0° C.—43–66% solid fats, balance liquid fats
   21.1° C.—32–52% solid fats, balance liquid fats
   26.6° C.—20–44% solid fats, balance liquid fats
   33.3° C.—6–25% solid fats, balance liquid fats
   40.0° C.—0–5% solid fats, balance liquid fats;
   wherein said bakery-compatible oil is selected from the group consisting of vegetable oils and liquid butter fats, and mixtures thereof, which exhibit the said solid fat index curve characteristic; and
   wherein said bakery-compatible oil solidifies at about 6° C. to about 12° C. and remains substantially solidified at temperatures below about 35° C. said process comprising the steps:
   (a) mixing the bakery-compatible, oil and the finely ground natural flavoring agent in a mixer at a temperature of about 35° C. to about 50° C. so as to obtain an homogenous mixture having the finely ground natural flavoring agent suspended therein;
   (i) pumping the homogenous mixture to a tempering unit, continually agitating the homogenous mixture while in the tempering unit, and slightly cooling the homogenous mixture to about 29° C. to about 34° C.;
   (j) transferring the slightly cooled homogenous mixture to a further mixing tank and mixing the granulated sugar therewith;
   (k) transferring a predetermined portion of the resultant sugar, finely ground natural flavoring agent, and oil mixture to a cooling means;
   (l) continuing to cool the predetermined portion of the homogenous mixture;
   (o) finally, removing the cooled predetermined portion of the sweetened flavored fat system for further handling and/or storage and/or shipping.

17. A process for the preparation of anhydrous fat-based discrete flavoring additives for incorporation into baked goods and flour confections, wherein said discrete flavoring additive comprises from substantially 0% to 2% by weight of moisture, from about 5% to about 15% by weight of a finely ground natural flavoring agent, from about 25% to about 35% by weight of a bakery-compatible oil that is substantially liquid at about 35° C. to about 40° C., with the balance being granulated sugar;

wherein said bakery-compatible oil exhibits a solid fat index curve characteristic having defined ranges of solid fat and liquid fat components at defined temperatures, as follows:
   10.0° C.—43–66% solid fats, balance liquid fats
   21.1° C.—32–52% solid fats, balance liquid fats
   26.6° C.—20–44% solid fats, balance liquid fats
   33.3° C.—6–25% solid fats, balance liquid fats
   40.0° C.—0–5% solid fats, balance liquid fats;
   wherein said bakery-compatible oil is selected from the group consisting of vegetable oils and liquid butter fats, and mixtures thereof, which exhibit the said solid fat index curve characteristic; and
   wherein said bakery-compatible oil solidifies at about 6° C. to about 12° C. and remains substantially solidified at temperatures below about 35° C.;
   said process comprising the steps of:
   (a) mixing said bakery-compatible oil and said finely ground natural flavoring agent in a mixer at a temperature of about 35° C. to about 50° C. so as to obtain an homogenous mixture having said finely ground natural flavoring agent suspended therein;
   (b) transferring said homogenous mixture to a holding tank, and maintaining the temperature of said homogenous mixture at about 39° C. to about 45° C.;
   (c) continuously agitating said homogenous mixture while it is in said holding tank;
   (d) pumping said homogenous mixture to a tempering unit, continually agitating said homogenous mixture while in said tempering unit, and slightly cooling said homogenous mixture to about 29° C. to 34° C.;
   (e) transferring said slightly cooled homogenous mixture to a further mixing tank and mixing said granulated sugar therewith;
   (f) transferring the resultant sugar, finely ground natural flavoring agent, and oil mixture to a further discrete particle manufacturing means so as to produce discrete flakes or chunks from said resultant sugar, finely ground natural flavoring agent, and oil mixture;
   (g) cooling said discrete flakes or chunks to a temperature of from about 6° C. to about 12° C.; and
   (h) removing said cooled discrete flakes or chunks for further handling and/or storage and/or shipping.

18. The process of claim 17, wherein said finely ground natural flavoring agent is selected from the group consisting of cinnamon, ginger, nutmeg, cloves, allspice, maple sugar, dehydrated maple syrup, and mixtures thereof.

19. The process of claim 18, wherein said finely ground natural flavoring agent is cinnamon.

20. The process of claim 19, wherein said granulated sugar is fine granulated sugar.

21. The process of claim 19, wherein said granulated sugar component comprises a mixture of coarse and fine granulated sugar.

22. The process of claim 21, wherein said mixture of coarse and fine granulated sugar comprises from at least 10% up to 90% of coarse granulated sugar with the balance of said mixture being fine granulated sugar.

23. The process of claim 19, wherein, when necessary, said solid fat constituents of said vegetable oils are processed by being blended or fractionated or hydrogenated only to the extent necessary so as to obtain the said solid fat index curve characteristic having said defined ranges of solid fat and liquid fat components at said defined temperatures.

24. A process for the manufacture of snack items which have first and second discrete layers, wherein said first discrete layer is anhydrous sweetened flavored molded fat system disk, and said second layer is a baked flour-based sweet biscuit;

wherein said first discrete layer comprises from substantially 0% to 2% by weight of moisture, from about 5% to about 15% by weight of a finely ground natural flavoring agent, from about 25% to about 35% by weight of a bakery-compatible oil that is substantially liquid at about 35° C. to about 40° C., with the balance being granulated sugar;

wherein said bakery-compatible oil exhibits a solid fat index curve characteristic having defined ranges of solid fat and liquid fat components at defined temperatures, as follows:

10.0° C.—3–66% solid fats, balance liquid fats
21.1° C.—32–52% solid fats, balance liquid fats
26.6° C.—20–44% solid fats, balance liquid fats
33.3° C.—6–25% solid fats, balance liquid fats
40.0° C.—0–5% solid fats, balance liquid fats;

wherein said bakery-compatible oil is selected from the group consisting of vegetable oils and liquid butter fats, and mixtures thereof, which exhibit the said solid fat index curve characteristic; and wherein said bakery-compatible oil solidifies at about 6° C. to about 12° C. and remains substantially solidified at temperatures below about 35° C.; said process comprising the steps of:

(a) mixing the bakery-compatible oil and the finely ground natural flavoring agent in a mixer at a temperature of about 35° C. to about 50° C so as to obtain an homogenous mixture having the finely ground natural flavoring agent suspended therein;

(i) pumping the homogenous mixture to a tempering unit, continually agitating the homogenous mixture while in the tempering unit, and slightly cooling the homogenous mixture to about 29° C. to about 34° C.;

(j) transferring the slightly cooled homogenous mixture to a further mixing tank and mixing the granulated sugar therewith;

(k) transferring a predetermined portion of the resultant sugar, finely ground natural flavoring agent, and oil mixture to a mold, in which the molded first discrete layer will be prepared;

(l) continuing to cool the predetermined portion of the homogenous mixture that has been placed in the mold, while it is still in the mold;

(m) before the homogenous mixture has cooled to the extent that the bakery-compatible oil is still at least slightly liquid, a pre-baked sweet biscuit is placed into the mold and onto the surface of the cooled homogenous mixture;

(n) continuing to cool the homogenous mixture and the sweet biscuit until the bakery-compatible oil constituent has solidified;

(o) finally, unmolding the cooled combination of the sweetened flavored fat system and sweet biscuit, for further handling and/or storage and/or shipping.

25. The process of claim 24 wherein step (m) further comprises applying a slight pressure against said sweet biscuit so as to slightly embed said biscuit into said at least slightly liquid homogenous mixture.

26. The process of claim 24 wherein step (n) is carried out by cooling the combination of said homogenous mixture and said sweet biscuit to a temperature of from about 6° C. to about 12° C.

* * * * *